(12) United States Patent
Atsumi et al.

(10) Patent No.: US 8,342,599 B2
(45) Date of Patent: Jan. 1, 2013

(54) STEERING SUPPORT MEMBER STRUCTURE

(75) Inventors: Ryo Atsumi, Shizuoka-ken (JP); Shinei Mochizuki, Shizuoka-ken (JP)

(73) Assignee: Suzuki Motor Corporation (JP)

( * ) Notice: Subject to any disclaimer, the term of this patent is extended or adjusted under 35 U.S.C. 154(b) by 0 days.

(21) Appl. No.: 13/216,485

(22) Filed: Aug. 24, 2011

(65) Prior Publication Data

US 2012/0049574 A1    Mar. 1, 2012

(30) Foreign Application Priority Data

Aug. 25, 2010  (JP) ................................. 2010-188256

(51) Int. Cl.
*B62D 25/14*    (2006.01)
(52) U.S. Cl. ..................................... 296/193.02; 296/70
(58) Field of Classification Search ............. 296/193.02, 296/70, 72; 180/90; 280/752
See application file for complete search history.

(56) References Cited

U.S. PATENT DOCUMENTS

| 5,324,203 | A | * | 6/1994 | Sano et al. ....................... 439/34 |
| 5,868,426 | A | * | 2/1999 | Edwards et al. ............... 280/779 |
| 6,155,631 | A | * | 12/2000 | Yoshinaka et al. ........ 296/193.02 |
| 6,250,678 | B1 | * | 6/2001 | Yoshinaka et al. ............. 280/752 |
| 7,841,648 | B2 | * | 11/2010 | Perarnau Ramos et al. ......................... 296/193.02 |
| 2009/0039668 | A1 | * | 2/2009 | Baudart .......................... 296/72 |

FOREIGN PATENT DOCUMENTS

| JP | 05-080969 A | 11/1993 |
| JP | 2006-327397 A | 12/2006 |

* cited by examiner

*Primary Examiner* — Jason S Morrow
(74) *Attorney, Agent, or Firm* — Lerner, David, Littenberg, Krumholz & Mentlik, LLP

(57) ABSTRACT

A steering support member has a steering support member 1 configured by two support members arranged in parallel; a first support member 9 arranged throughout the entire vehicle width, and a second support member 10 arranged in a zone corresponding to the front position on the driver's seat side; the first and second support members 9 and 10 are connected with a steering bracket 11; the vehicle body side end portion of the second support member 10 attached to the vehicle body via an end connecting bracket 8 together with the first support member 9, and the vehicle body opposite side end portion of the second support member 10 attached to the first support member 9 via an intermediate connecting bracket 12; and the intermediate connecting bracket 12 connected to a floor panel 5 via a first brace 13 and connected to a cowl panel 2 via a second brace 14.

2 Claims, 2 Drawing Sheets

STEERING SUPPORT MEMBER STRUCTURE

CROSS-REFERENCE TO RELATED APPLICATIONS

The present application claims the benefit of Japanese Patent Application No. 2010-188256, filed Aug. 25, 2010, the disclosure of which is hereby incorporated by reference herein.

FIELD OF THE INVENTION

The present invention relates to a structure of a steering support member installed over the vehicle body width direction in an instrument panel of a motor vehicle to support a steering column and the like.

DESCRIPTION OF RELATED ART

Conventionally, in an instrument panel of a motor vehicle, a steering support member, which is a rigid member for supporting a steering column and the like, has been installed over the vehicle body width direction. Both ends in the vehicle body width direction of the steering support member are attached to right and left dash side panels (pillars) of the vehicle body. Also, on the driver's seat side of the steering support member, a steering column is supported via a steering bracket, an instrument panel is mounted, and heavy parts such as instruments and audio equipment attached to the instrument panel are suspended.

If the rigidity of a surrounding portion of such a steering support member is low, vibrations caused by a suspension or vibrations caused by an engine especially occurring at the idling time are transmitted to a steering system, and the vibrations are transmitted to the driver, or result in generation of in-compartment noise. Thereby, an unpleasant feeling is given to the passengers, and additionally a squeaking sound may be generated by the vibrations of equipment. Also, when a load is applied from the vehicle body front, an upper portion of a dash panel and a cowl panel are deformed so as to intrude into the vehicle compartment, and thereby the steering support member is deformed toward the vehicle body rear, which poses a problem of retreat of a steering wheel.

Therefore, for the steering support member, it has been required that the support member itself be made highly rigid, and the connection strength of the support member and the vehicle body be enhanced to improve the vibration characteristics and to reduce deformation caused by a load applied from the vehicle body front. In particular, a front-and-rear (from the front slantwise upside to the rear slantwise downside) vibration mode in which the center in the vehicle body width direction of the steering support member is the antinode of vibration curve and a front-and-rear vibration mode in which both the ends and the center of the steering support member are nodes are problems.

To solve these problems, among the conventional motor vehicles, some motor vehicles are configured so that, as disclosed in Patent Document 1, the steering support member is connected to the cowl panel and the dash panel in the vehicle body front by using a brace or the steering support member is connected to the lower portion of the dash panel or a floor panel in the lower portion of vehicle body by using a brace to reduce the vibrations and deformation of the steering support member.

Also, some motor vehicles are configured so that, as disclosed in Patent Document 2, to improve the rigidity of the steering support member on the driver's seat side, the steering support member is formed by two pipes and is formed so that the diameter of the pipe on the vehicle body front side is larger than that of the pipe on the vehicle body rear side.

Patent Document 1: JP 5-80969 U
Patent Document 2: JP 4485992 B

Recently, however, the requirement for reducing in-compartment noise and the requirement for reducing steering vibrations have been stringent. Therefore, it is necessary to reduce not only the number of vibrations of a single frequency but also the number of vibrations in a wide frequency range. To satisfy this necessity, a structure of the steering support member and the surroundings of the member, which is less liable to have a vibration peak and can regulate the vibration characteristics matching the vehicle types, has been demanded.

For the structure of the conventional steering support member disclosed in Patent Document 1, the brace cannot sufficiently transmit the load to the cowl panel, dash panel, and floor panel, so that the above-described requirements for reducing in-compartment noise and for reducing steering vibrations cannot be met. Also, for the structure of the conventional steering support member disclosed in Patent Document 2, the diameter of the pipe on the vehicle body rear side, the pipe being important for the contribution to the steering vibration performance, is small, and the pipe on the vehicle body rear side is installed over the vehicle body width direction, so that there arises a problem that the performance for restraining vibrations is degraded.

SUMMARY OF THE INVENTION

The present invention has been made in view of the above circumstances, and accordingly an object thereof is to provide a structure of a steering support member, which can improve the rigidity and mounting strength of the steering support member in the front on the driver's seat side, can reduce in-compartment noise and steering vibrations, can reduce the deformation of the steering support member when a load is applied from the vehicle body front, and can improve the vibration characteristics peculiar to the vehicle type by making a small design change, for example, by selecting the position of an intermediate connecting bracket or by selecting the rigidity of first and second braces.

To achieve the above object, the present invention provides a steering support member structure which is constructed across a width of a vehicle body and is attached to left and right sides of the vehicle body at both ends in a vehicle-body width direction via an end-part-connection bracket, wherein the steering support member comprises two support members disposed side by side in parallel, a first support member being disposed across the entire width of the vehicle body and a second support member being disposed in a corresponding location on a driver seat side, and the first and second support members are connected with a steering bracket; wherein an end part on the vehicle body side of the second support member is attached, along with the first support member, to the vehicle body via the end-part-connection bracket, and an end part opposite the vehicle body of the second support member is attached to the first support member via an intermediate-part-connection bracket, and the intermediate connecting bracket is connected to a floor panel or a lower portion of a dash panel via a first brace extending in the vehicle body up-and-down direction, and is connected to a cowl panel or an upper portion of the dash panel via a second brace extending in the vehicle body front-and-rear direction.

In the present invention, in the center in the vehicle body width direction of the second support member, a third brace is arranged which extends in the vehicle body front-and-rear direction, one end part of which is connected to the first support member only or both of the first and second support members, and the other end part of which is connected to the cowl panel or an upper portion of the dash panel; and the third brace is arranged so as to overlap with a part of the steering bracket in the vehicle body width direction.

Also, in the present invention, the end connecting bracket is formed with a level difference part extending in the vehicle body width direction in a portion in the vehicle body front-and-rear direction; the portion on the vehicle body front side of the end connecting bracket is located on the outside in the vehicle body width direction; and of the end connecting brackets arranged on both sides in the vehicle body width direction, one end connecting bracket is configured so that the first support member is connected to a vehicle body front-side portion of the level difference part and the second support member is connected to a vehicle body rear-side portion of the level difference part, and the other end connecting bracket is configured so that the first support member is connected to a vehicle body front-side portion of the level difference part.

Furthermore, in the present invention, of the first and second support members, the first support member is arranged on the vehicle body front side, and the second support member is arranged on the vehicle body rear side; and the diameter of the second support member is set so as to be larger than the diameter of the first support member.

As described above, the present invention provides the structure of a steering support member which is installed over the vehicle body width direction and is attached to the vehicle body on the right-hand and left-hand sides via the end connecting bracket at both ends in the vehicle body width direction. In the structure of a steering support member, the steering support member is configured by the two support members arranged in parallel, the first support member is arranged throughout the entire vehicle width, the second support member is arranged in a zone corresponding to the front position on the driver's seat side, and the first and second support members are connected with the steering bracket; the vehicle body side end portion of the second support member is attached to the vehicle body via the end connecting bracket together with the first support member, and the vehicle body opposite side end portion of the second support member is attached to the first support member via the intermediate connecting bracket; and the intermediate connecting bracket is connected to the floor panel or the lower portion of the dash panel via the first brace extending in the vehicle body up-and-down direction, and is connected to the cowl panel or the upper portion of the dash panel via the second brace extending in the vehicle body front-and-rear direction.

In the structure of the present invention, both ends of the two support members constituting the steering support member are fixed by the end connecting brackets and the intermediate connecting bracket, the steering support member functions as one support member, and the intermediate connecting bracket at a boundary position at which the rigidity is low is connected to the vehicle body-side panel on the vehicle body front side and the vehicle body downside by the second and first braces, respectively. Therefore, both ends of the two support members can be attached reliably to the vehicle body side, and the two support members can be fixed firmly to each other, so that the rigidity of the whole of the steering support member can be improved. Moreover, since the second support member on the vehicle body rear side is arranged on the driver's seat side only, the degree of freedom of layout of audio equipment and a temperature control panel, which has been difficult to design for the conventional structure, can be increased.

Furthermore, according to the structure of the present invention, since the rigidity of the steering support member in the front on the driver's seat side is improved, and the strength of mounting with the peripheral parts is improved, in-compartment noise and steering vibrations are reduced, and the steering operability and the comfort in the vehicle compartment can be improved. Moreover, according to the structure of the present invention, the deformation of the steering support member caused when a load is applied from the vehicle body front is reduced, and the vibration characteristics peculiar to the vehicle type can be improved by making a small design change, for example, by selecting the position of the intermediate connecting bracket or by selecting the rigidity of the first and second braces. Therefore, the structure can be applied to various types of motor vehicles while having little effect on the layout of the peripheral parts.

Also, in the structure of the present invention, in the center in the vehicle body width direction of the second support member, the third brace is arranged which extends in the vehicle body front-and-rear direction, one end part of which is connected to the first support member only or both of the first and second support members, and the other end part of which is connected to the cowl panel or the upper portion of the dash panel. Also, the third brace is arranged so as to overlap with a part of the steering bracket in the vehicle body width direction. Therefore, the rigidity of the antinode portion of the vibration mode in which the central portion of the two support members in the front on the driver's seat side is the antinode of vibration curve is improved by two members of the steering bracket and the third brace, so that the vibrations of the steering support member can be reduced further.

Furthermore, in the structure of the present invention, the end connecting bracket is formed with the level difference part extending in the vehicle body width direction in the portion in the vehicle body front-and-rear direction; the portion on the vehicle body front side of the end connecting bracket is located on the outside in the vehicle body width direction; and of the end connecting brackets arranged on both sides in the vehicle body width direction, the one end connecting bracket is configured so that the first support member is connected to the vehicle body front-side portion of the level difference part and the second support member is connected to the vehicle body rear-side portion of the level difference part, and the other end connecting bracket is configured so that the first support member is connected to the vehicle body front-side portion of the level difference part. Therefore, the lengths of the two support members constituting the steering support member on the driver's seat side are different, and the vibration characteristics of the end connecting bracket are not single characteristics of a flat plate but are complicated characteristics having the level difference part. Therefore, according to the structure of the present invention, the vibration characteristics of the steering support member can be improved.

Also, in the structure of the present invention, of the first and second support members, the first support member is arranged on the vehicle body front side, and the second support member is arranged on the vehicle body rear side; and the diameter of the second support member is set so as to be greater than the diameter of the first support member. Therefore, the deformation of the steering support member caused when a load is applied from the vehicle body front can be reduced, and the vibrations of a steering wheel can be restrained. Also, by changing the vibration characteristics of the two support members, the vibration characteristics of the steering support member can be improved.

Furthermore, according to the structure of the present invention, by making the diameter of the support member on the vehicle body front side smaller, the degree of freedom of layout of the peripheral parts can be increased, and the support member on the vehicle body front side can be connected in a straight line throughout the entire vehicle width, so that the rigidity equivalent to that of the steering support member having the conventional structure can be ensured. Moreover, according to the structure of the present invention, since the steering support member is configured by two support members, the division of roles of the two support members can be clarified. Therefore, merely by directly connecting the second support member on the vehicle body rear side to the first support member on the vehicle body front side only, a sufficient rigidity effect can be achieved, and the excess increase in weight and cost can be prevented.

DETAILED DESCRIPTION OF PREFERRED EMBODIMENTS

An embodiment of the present invention will now be described in detail with reference to the accompanying drawings.

Figure 1:
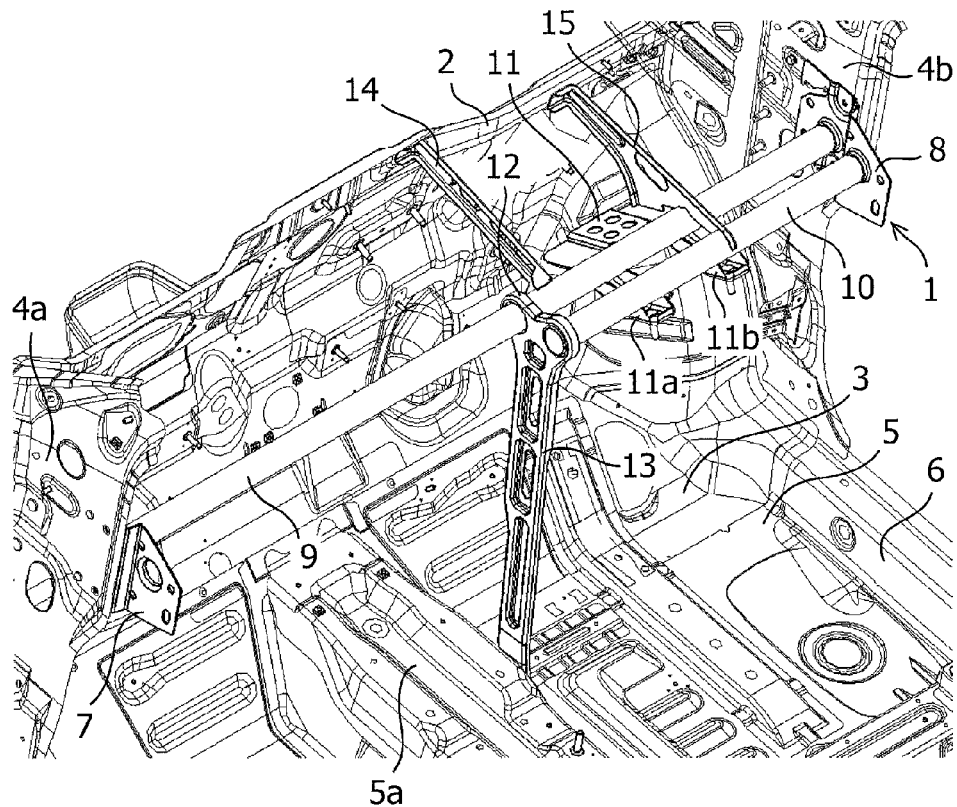
FIG. 1 is a perspective view showing a state in which a steering support member having a structure in accordance with an embodiment of the present invention is attached to a vehicle body in a vehicle compartment of a motor vehicle.
Figure 2:
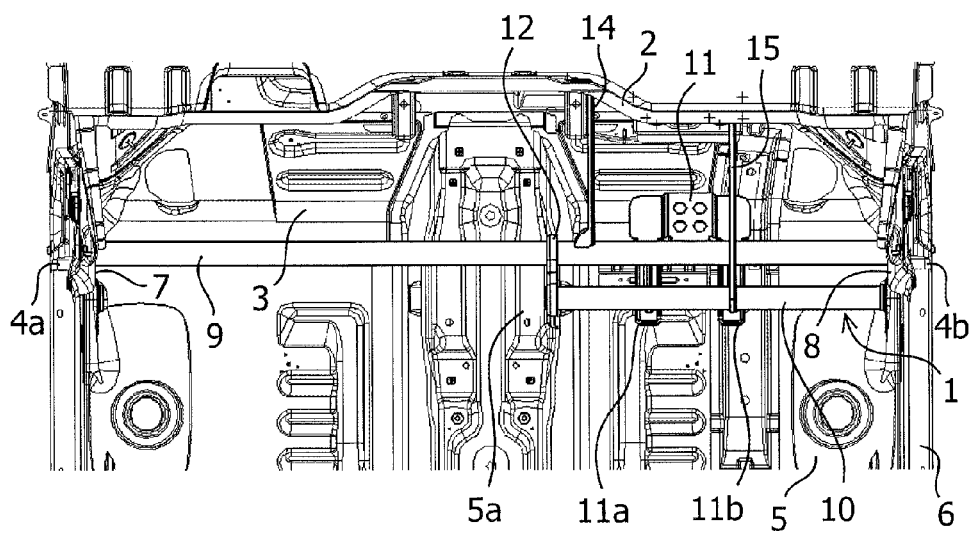
FIG. 2 is a plan view of the steering support member shown in FIG. 1.
Figure 3:
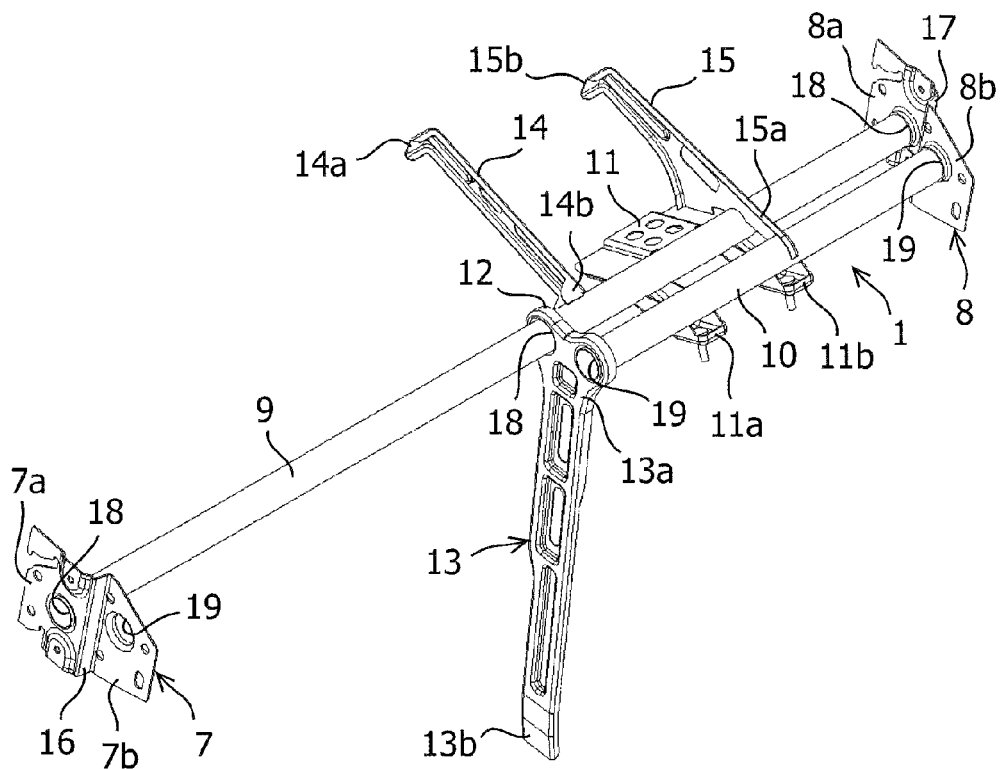
FIG. 3 is a perspective view showing a structure of a steering support member in accordance with an embodiment of the present invention.
Figure 4:
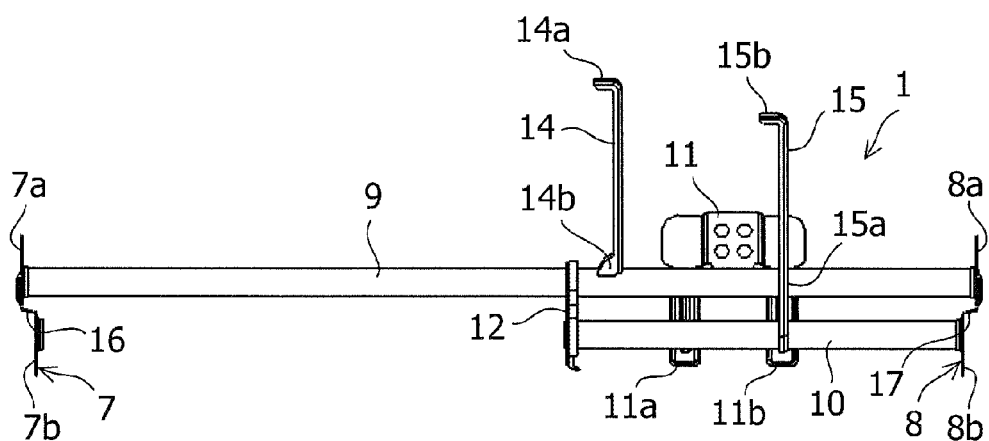
FIG. 4 is a plan view showing the structure of a steering support member shown in FIG. 3.

FIG. 1 is a perspective view showing an interior of a vehicle compartment of a motor vehicle to which a structure of a steering support member in accordance with the embodiment of the present invention is applied, FIG. 2 is a plan view of the interior of the vehicle compartment shown in FIG. 1, FIG. 3 is a perspective view showing the structure of a steering support member in accordance with this embodiment, and FIG. 4 is a plan view showing the structure of a steering support member shown in FIG. 3.

As shown in FIGS. 1 and 2, in an upper portion on the front side in a vehicle compartment of a motor vehicle, a steering support member 1, which is a rigid member extending in the vehicle body width direction, is disposed. The steering support member 1 is arranged in an instrument panel (not shown) consisting of a large resin-molded part mounted with various pieces of equipment to support the instrument panel, a steering column (not shown), and the like.

The vehicle body in an up-and-down portion on the front side in the vehicle compartment of a motor vehicle is configured by a cowl panel 2 and a dash panel 3, and the vehicle body in each of left and right side portions in the vehicle body width direction is configured by a dash side panel 4a, 4b. On the vehicle body rear side of the lower portion of the dash panel 3, a floor panel 5 and side sills 6 are disposed. In the central portion in the vehicle body width direction of the floor panel 5, a convex floor tunnel 5a extending in the vehicle body front-and-rear direction is provided.

As shown in FIGS. 1 to 4, the steering support member 1 of this embodiment is installed over the vehicle body width direction, and is attached, at both ends in the vehicle body width direction, to the dash panels 4a and 4b, which are left and right vehicle body side walls, via end connecting brackets 7 and 8 on both the left-hand and right-hand sides.

Also, the steering support member 1 of this embodiment is configured by a long first support member 9 and a short second support member 10, which are formed of two pipe materials and arranged in parallel with a fixed clearance being provided therebetween in the vehicle body front-and-rear direction. The first support member 9 is arranged throughout the entire vehicle width, and the second support member 10 is arranged in a zone corresponding to the front position on the driver's seat side. Of the first and second support members 9 and 10, the first support member 9 is arranged on the vehicle body front side, and the second support member 10 is arranged on the vehicle body rear side. The diameter of the second support member 10 is set so as to be greater than the diameter of the first support member 9.

The first and second support members 9 and 10 are arranged so as to be connected with a steering bracket 11. The steering bracket 11 is formed in a U shape, in plan view, the vehicle body rear side of which is open, and support pieces 11a and 11b extending in the vehicle body front-and-rear direction are arranged in parallel so as to stride the first and second support members 9 and 10.

The vehicle body side end portion of the second support member 10 is attached to the dash side panel 4b via the end connecting bracket 8 on the right-hand side together with the first support member 9. Also, the vehicle body opposite side end portion of the second support member 10 is attached to the first support member 9 via an intermediate connecting bracket 12.

The intermediate connecting bracket 12 is connected to the floor panel 5 via a first brace 13 extending in the vehicle body up-and-down direction, and is also connected to the cowl panel 2 via a second brace 14 extending in the vehicle body front-and-rear direction. Therefore, an upper end part 13a of the first brace 13 is formed integrally with the intermediate connecting bracket 12, and a lower end part 13b of the first brace 13 is connected to the side surface of the floor tunnel 5a. Also, a front end part 14a of the second brace 14 is connected to the cowl panel 2 by being bent at right angles toward the vehicle body width direction, and a rear end part 14b of the second brace 14 is connected to the intermediate connecting bracket 12 by being joined to the outer peripheral surface of the first support member 9 by a flange bent at right angles toward the vehicle body width direction. In this embodiment, the intermediate connecting bracket 12 and the first brace 13 are formed integrally with each other. However, the two members may be separate members.

Furthermore, as shown in FIGS. 1 to 4, in the center in the vehicle body width direction of the second support member 10, a third brace 15 is arranged which extends in the vehicle body front-and-rear direction, one end part 15a of which is connected to both of the first and second support members 9 and 10, and the other end part 15b of which is connected to the cowl panel 2. Specifically, the one end part 15a of the third brace 13 is connected to both of the first and second support members 9 and 10 by being formed in a shape corresponding to the outer peripheral surfaces of the first and second support members 9 and 10, and the other end part 15b of the third brace 15 is connected to the cowl panel 2 by being bent at right angles toward the vehicle body width direction.

Moreover, the third brace 15 is arranged so as to overlap with the one support piece 11b, which is a part of the steering bracket 11, in the vehicle body width direction. In this embodiment, the one end part 15a of the third brace 15 is connected to both of the first and second support members 9 and 10. However, the one end part 15a of the third brace 15 may be connected to the first support member 9 only.

On the other hand, as shown in FIGS. 3 and 4, each of the end connecting brackets 7 and 8 on both the left-hand and right-hand sides of this embodiment is formed with a level difference part 16, 17 extending in the vehicle body width direction in a portion in the vehicle body front-and-rear direction. A part 7a, 8a on the vehicle body front side is located on the outside in the vehicle body width direction with respect to a part 7b, 8b on the vehicle body rear side. Of the end connecting brackets 7 and 8 on both the left-hand and right-hand sides, the one right end connecting bracket 8 is configured so that the first support member 9 is connected to the part 8a on the vehicle body front side of the level difference part 17, and the second member 10 is connected to the part 8b on the vehicle body rear side of the level difference part 17. Also, the other left end connecting bracket 7 is configured so that the first support member 9 is connected to the part 7a on the vehicle body front side of the level difference part 16.

Therefore, as shown in FIG. 3, the front and rear parts 7a, 7b, 8a and 8b of the end connecting brackets 7 and 8 are formed with insertion holes 18 and 19 in which the first and second support members 9 and 10 are inserted. The first and second support members 9 and 10 are fixed to the end connecting brackets 7 and 8 by welding in a state of being inserted in the insertion holes 18 and 19. In the front and rear of the intermediate connecting bracket 12 as well, like the end connecting brackets 7 and 8, the insertion holes 18 and 19 in which the first and second support members 9 and 10 are inserted are formed.

As described above, the steering support member 1 having the structure in accordance with the embodiment of the present invention is configured by the first support member 9 arranged throughout the entire vehicle width and the second support member 10 arranged in the zone corresponding to the position on the driver's seat side on the vehicle body rear side, the support pieces 11a and 11b of the steering bracket 11 having a U shape in plan view are connected to the first and second support members 9 and 10, the vehicle body side end portion of the second support member 10 is attached to the dash side panel 4b via the end connecting bracket 8 together with the first support member 9, the vehicle body opposite side end portion of the second support member 10 is attached to the first support member 9 via the intermediate connecting bracket 12, and furthermore, the intermediate connecting bracket 12 is connected to the floor panel 5 via the first brace 13 and connected to the cowl panel 2 via the second brace 14. Therefore, not only both ends of the first support member 9 but also both ends of the second support member 10 constituting the steering support member 1, can be attached reliably to the dash side panel 4b and the first support member 9, and the rigidity of the entire of the steering support member 1 can be improved. Thereby, even when a load is applied from the vehicle body front, especially, to the driver's seat side, the deformation of the first and second support members 9 and 10 constituting the steering support member 1 to the vehicle body rear can be reduced.

Also, in the center in the vehicle body width direction of the second support member 10 in accordance with the embodiment of the present invention, the third brace 15 is disposed which is configured so that one end part 15a thereof is connected to both of the first and second support members 9 and 10 and the other end part 15b thereof is connected to the cowl panel 2, and the third brace 15 overlaps in the vehicle body width direction with the support piece 11b of the steering bracket 11. Therefore, the rigidity of the antinode portion of the vibration mode in which the central portion of the first and second support members 9 and 10 in the front on the driver's seat side is the antinode of vibration curve is improved by the steering bracket 11 and the third brace 15, so that the vibrations of the steering support member 1 can be reduced significantly.

Furthermore, each of both of the left and right end connecting brackets 7 and 8 in accordance with the embodiment of the present invention is formed with the level difference part 16, 17 extending in the vehicle body width direction in a portion in the vehicle body front-and-rear direction. The part 7a, 8a on the vehicle body front side is arranged on the outside in the vehicle body width direction. The one right end connecting bracket 8 is configured so that the first support member 9 is connected to the part 8a on the vehicle body front side, and the second member 10 is connected to the part 8b on the vehicle body rear side. The other left end connecting bracket 7 is configured so that only the first support member 9 is connected to the part 7a on the vehicle body front side. Therefore, the lengths of the two support members 9 and 10 constituting the steering support member 1 on the driver's seat side are different, and the vibration characteristics of the end connecting bracket 7, 8 are not single characteristics of a flat plate, but complicated characteristics having the level difference part 16, 17, so that the vibration characteristics of the steering support member 1 can be improved.

Also, of the first and second support members 9 and 10, the first support member 9 is arranged on the vehicle body front side, and the second support member 10 is arranged on the vehicle body rear side. The diameter of the second support member 10 is set so as to be larger than the diameter of the first support member 9. Therefore, the vibrations of a steering wheel can be restrained, and the deformation of the steering support member 1 caused when a load is applied from the vehicle body front can be reduced. Furthermore, by making the diameter of the first support member 9 on the vehicle body front side smaller, the degree of freedom of layout of the peripheral parts can be increased.

The above is a description of an embodiment of the present invention. The present invention is not limited to the above-described embodiment, and various modifications and changes can be made based on the technical concept of the present invention.

For example, in the above-described embodiment, the lower end part 13b of the first brace 13 is connected to the floor panel 5. However, depending on the vehicle type to which the present invention is applied, the lower end part 13b of the first brace 13 may be connected to a lower portion of the dash panel 3. Also, in the above-described embodiment, the front end part 14a of the second brace 14 and the other end part 15b of the third brace 15 are connected to the cowl panel 2. However, depending on the vehicle type to which the present invention is applied, these end parts may be connected to upper portions of the dash panel 3.

What is claimed is:
1. A steering support member structure which is constructed across a width of a vehicle body and is attached to left and right sides of the vehicle body at both ends in a vehicle-body width direction via an end-part-connection bracket,
wherein the steering support member comprises two support members disposed side by side in parallel, a first support member being disposed across the entire width of the vehicle body and a second support member being disposed in a corresponding location on a driver seat side, and the first and second support members are connected with a steering bracket;

wherein an end part on the vehicle body side of the second support member is attached, along with the first support member, to the vehicle body via the end-part-connection bracket, and an end part opposite the vehicle body of the second support member is attached to the first support member via an intermediate-part-connection bracket, and the intermediate connecting bracket is connected to a floor panel or a lower portion of a dash panel via a first brace extending in the vehicle body up-and-down direction, and is connected to a cowl panel or an upper portion of the dash panel via a second brace extending in the vehicle body front-and-rear direction, wherein in the center in the vehicle body width direction of the second support member, a third brace is arranged which extends in the vehicle body front-and-rear direction, one end part of which is connected to the first support member only or both of the first and second support members, and the other end part of which is connected to the cowl panel or an upper portion of the dash panel; and the third brace is arranged so as to overlap with a part of the steering bracket in the vehicle body width direction.

2. The structure of a steering support member according to claim 1, wherein the end connecting bracket is formed with a level difference part extending in the vehicle body width direction in a portion in the vehicle body front-and-rear direction; the portion on the vehicle body front side of the end connecting bracket is located on the outside in the vehicle body width direction; and of the end connecting brackets arranged on both sides in the vehicle body width direction, one end connecting bracket is configured so that the first support member is connected to a vehicle body front-side portion of the level difference part and the second support member is connected to a vehicle body rear-side portion of the level difference part, and the other end connecting bracket is configured so that the first support member is connected to a vehicle body front-side portion of the level difference part.

* * * * *